US012736906B2

(12) United States Patent
Watanabe et al.

(10) Patent No.: US 12,736,906 B2
(45) Date of Patent: Sep. 15, 2026

(54) IMAGE FORMING APPARATUS AND IMAGE FORMING METHOD

(71) Applicant: KYOCERA Document Solutions Inc., Osaka (JP)

(72) Inventors: Masaru Watanabe, Osaka (JP); Makoto Matsumoto, Osaka (JP); Yasuaki Sakamoto, Osaka (JP); Ayato Morikami, Osaka (JP); Yukiko Kotani, Osaka (JP); Atsuki Ito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/064,671

(22) Filed: Feb. 26, 2025

(65) Prior Publication Data

US 2025/0271799 A1 Aug. 28, 2025

(30) Foreign Application Priority Data

Feb. 28, 2024 (JP) ................................ 2024-028665

(51) Int. Cl.

| | |
|---|---|
| ***G03G 15/00*** | (2006.01) |
| ***G03G 15/01*** | (2006.01) |
| ***G03G 15/16*** | (2006.01) |
| ***G03G 21/02*** | (2006.01) |
| ***G06K 15/02*** | (2006.01) |

(52) U.S. Cl.

CPC ..... *G03G 15/5029* (2013.01); *G03G 15/0131* (2013.01); *G03G 15/0189* (2013.01); *G03G 15/1605* (2013.01); *G03G 21/02* (2013.01); *G06K 15/1868* (2013.01); *G03G 2215/00751* (2013.01); *G06K 15/1882* (2013.01); *G06K 2215/0094* (2013.01)

(58) Field of Classification Search

CPC .......... G03G 15/0131; G03G 15/0189; G03G 15/1605; G03G 15/50; G03G 15/5029; G03G 21/02; G03G 2215/00751; G06K 15/1868; G06K 15/1882; G06K 2215/0094

See application file for complete search history.

(56) References Cited

U.S. PATENT DOCUMENTS

2009/0257778 A1* 10/2009 Isobe .................... G03G 15/50 399/167

2011/0182598 A1* 7/2011 Watanabe .......... G03G 15/0131 399/39

2013/0089353 A1* 4/2013 Son ...................... G03G 15/50 399/82

FOREIGN PATENT DOCUMENTS

JP 2021135305 A 9/2021

* cited by examiner

*Primary Examiner* — Sophia S Chen
(74) *Attorney, Agent, or Firm* — Alleman Hall LLP

(57) ABSTRACT

In an image forming apparatus, an adjustment processing portion allows, in a case where a printing type of a print process to be executed by a print processing portion is changed from either monochrome or color printing, a condition adjustment process of adjusting an image formation condition of an image forming portion to be executed before execution of the monochrome or color printing subsequent to a change of the printing type. The print processing portion allows line speed of the image forming portion to be changed depending on a combination of a line speed mode and the printing type set in association with a sheet type of a sheet. In addition, the adjustment processing portion allows execution of the condition adjustment process to be restricted if the line speed mode is identical before and after a change of the printing type and a restriction condition is set in advance.

10 Claims, 9 Drawing Sheets

| LINE SPEED MODE | SHEET TYPE | PRINTING TYPE | |
|---|---|---|---|
| | | MONOCHROME PRINTING | COLOR PRINTING |
| FULL-SPEED MODE | PLAIN PAPER | M1 | C1 |
| MIDDLE-SPEED MODE | MIDDLE-THICK PAPER | M2 | C2 |
| HALF-SPEED MODE | THICK PAPER | M3 | C3 |

IMAGE FORMING APPARATUS AND IMAGE FORMING METHOD

INCORPORATION BY REFERENCE

This application is based upon and claims the benefit of priority from the corresponding Japanese Patent Application No. 2024-028665 filed on Feb. 28, 2024, the entire contents of which are incorporated herein by reference.

This disclosure relates to an image forming apparatus and an image forming method.

BACKGROUND

An electrophotographic image forming apparatus includes an image forming portion that forms an image based on input image data on a sheet. The image forming apparatus of this type executes condition adjustment processes of adjusting various image formation conditions of the image forming portion such as the amount of laser light and a developing bias voltage at timings set in advance. For example, in a case where the line speed of a transfer destination object such as an intermediate transfer belt of the image forming portion is changed, the condition adjustment processes are each executed before the execution of a print process subsequent to the change of the line speed in some cases.

SUMMARY

An image forming apparatus according to an aspect of this disclosure includes a print processing portion and an adjustment processing portion. The print processing portion controls an image forming portion including image forming units corresponding to a plurality of colors, and executes monochrome printing of forming a monochrome image on a sheet on the basis of input image data or color printing of forming a color image on the sheet on the basis of the input image data. The adjustment processing portion allows, in a case where a printing type of a print process to be executed by the print processing portion is changed from one of the monochrome printing and the color printing to another, a condition adjustment process of adjusting an image formation condition of the image forming portion to be executed before execution of the monochrome printing or the color printing subsequent to a change of the printing type. The print processing portion allows line speed of the image forming portion to be changed depending on a combination of a line speed mode and the printing type set in advance in association with a sheet type of the sheet. The adjustment processing portion allows execution of the condition adjustment process to be restricted in a case where the line speed mode is identical before and after a change of the printing type and a restriction condition set in advance is satisfied.

An image forming method according to another aspect of this disclosure is a method in which one or more processors execute a print step and an adjustment step. The print step controls an image forming portion including image forming units corresponding to a plurality of colors, and executes monochrome printing of forming a monochrome image on a sheet on the basis of input image data or color printing of forming a color image on the sheet on the basis of the input image data. The adjustment step allows, in a case where a printing type of a print process to be executed by the print step is changed from one of the monochrome printing and the color printing to another, a condition adjustment process of adjusting an image formation condition of the image forming portion to be executed before execution of the monochrome printing or the color printing subsequent to a change of the printing type. The print step allows line speed of the image forming portion to be changed depending on a combination of a line speed mode and the printing type set in advance in association with a sheet type of the sheet. The adjustment step allows execution of the condition adjustment process to be restricted in a case where the line speed mode is identical before and after a change of the printing type and a restriction condition set in advance is satisfied.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a schematic diagram showing a configuration of an image forming portion of the image forming apparatus according to the embodiment of this disclosure.

FIG. 4 is a diagram showing an example of line speed association information used by the image forming apparatus according to the embodiment of this disclosure.

DETAILED DESCRIPTION

Hereinafter, an embodiment of this disclosure will be described with reference to the accompanying drawings. It is to be noted that the following embodiments are specific examples of this disclosure and do not limit the technical scope of this disclosure.

First, the configuration of an image forming apparatus 100 according to an embodiment of this disclosure will be described with reference to FIGS. 1 and 2.

It is to be noted that the perpendicular direction with the image forming apparatus 100 placed in an installation state (state shown in FIG. 1) that allows for use is defined as an up-down direction D1 for convenience of description. In addition, a front-back direction D2 is defined by using the surface of the image forming apparatus 100 shown in FIG.

Figure 1:
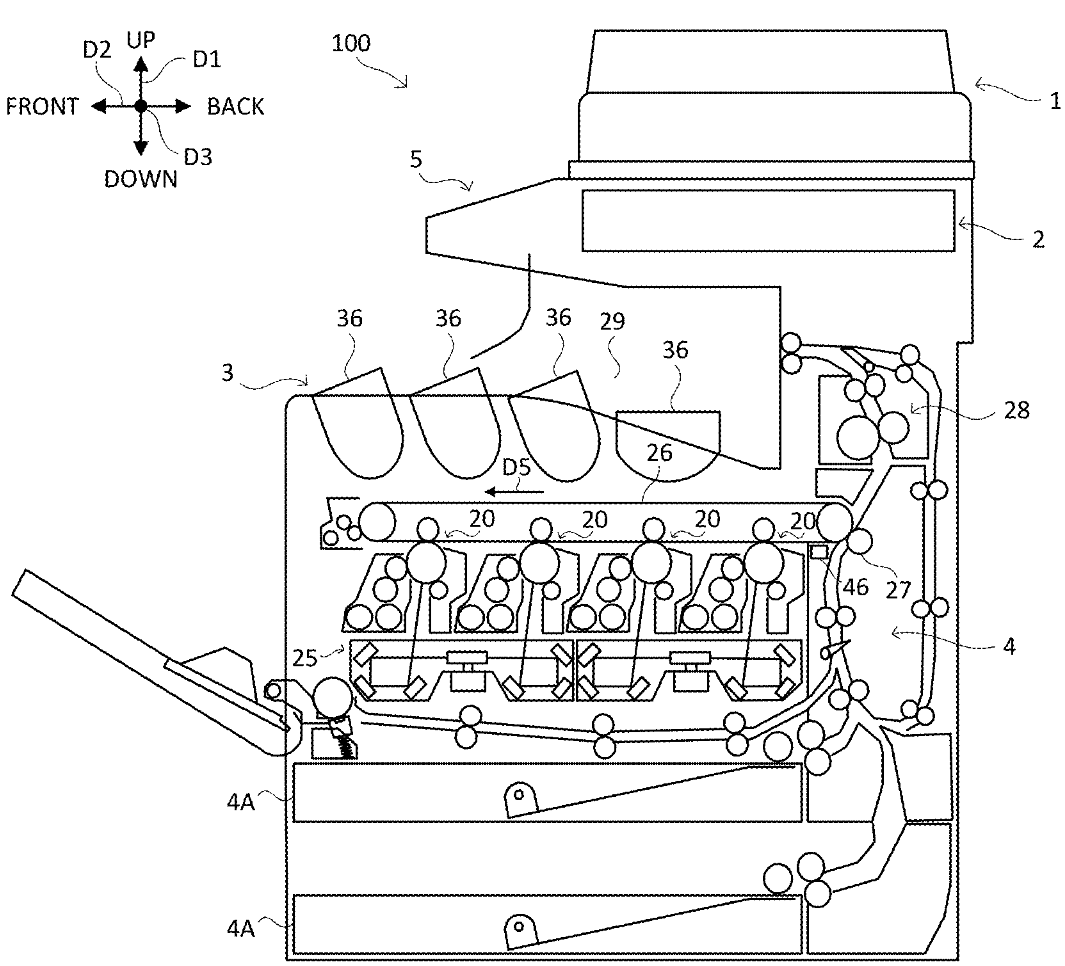
FIG. 1 is a cross-sectional view of a configuration of an image forming apparatus according to an embodiment of this disclosure.

1 corresponding to the left of FIG. 1 as a front (front surface). Furthermore, a left-right direction D3 is defined on the basis of the front of the image forming apparatus 100 in the installation state.

The image forming apparatus 100 is a multifunction peripheral having a plurality of functions such as a facsimile function and a copy function along with a scan function of reading an image on a document sheet and a print function of forming an image on the basis of image data. It is to be noted that this disclosure may be applied to an image forming apparatus such as a printer, a facsimile apparatus, and a copier each capable of forming an image by electrophotography.

Figure 2:
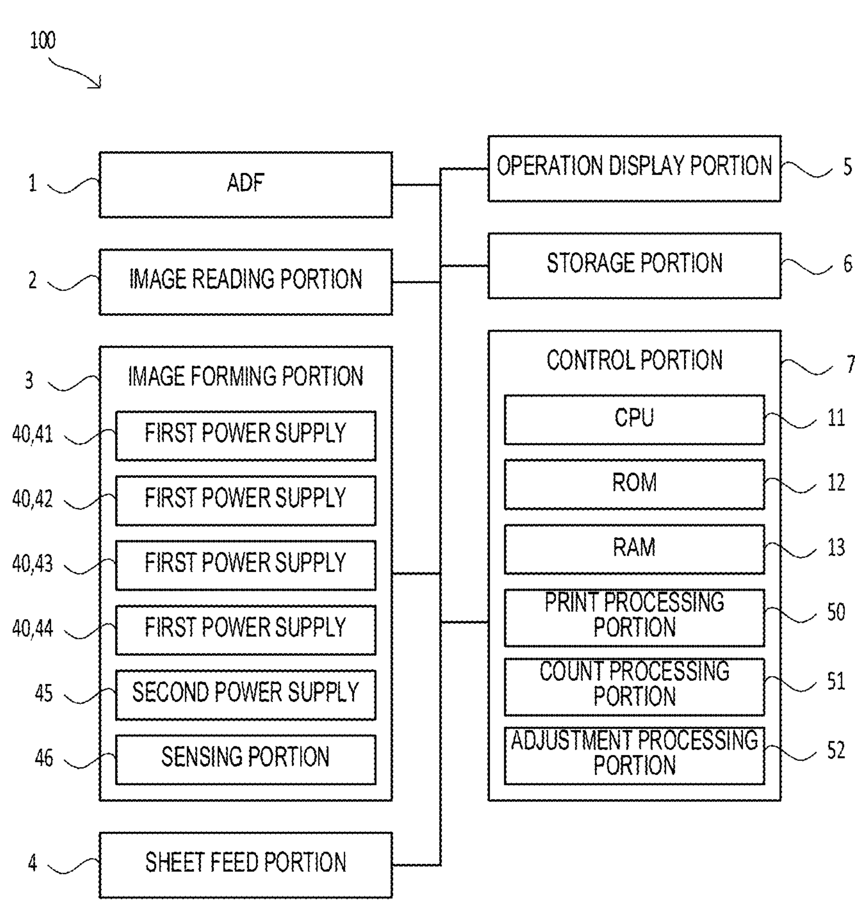
FIG. 2 is a block diagram showing a system configuration of the image forming apparatus according to the embodiment of this disclosure.

As shown in FIGS. 1 and 2, the image forming apparatus 100 includes an auto document feeder (ADF) 1, an image reading portion 2, an image forming portion 3, a sheet feed portion 4, an operation display portion 5, a storage portion 6, and a control portion 7.

The ADF 1 conveys a document sheet to be read by the scan function. The ADF 1 includes a document sheet set portion, a plurality of conveying rollers, a document sheet holder, and a sheet discharge portion.

The image reading portion 2 achieves the scan function. The image reading portion 2 includes a document sheet table, a light source, a plurality of mirrors, an optical lens, and a charge coupled device (CCD).

The image forming portion 3 achieves the print function. Specifically, the image forming portion 3 forms a color image or a monochrome image on a sheet supplied from the sheet feed portion 4 in accordance with electrophotography.

The sheet feed portion 4 supplies a sheet to the image forming portion 3. The sheet feed portion 4 includes a plurality of sheet feed cassettes 4A, a manual feed tray, and a plurality of conveying rollers. It is to be noted that the control portion 7 allows the sheet type of sheets stored in each of the sheet feed cassettes 4A to be set in advance in response to a user operation. Specifically, the sheet type includes a plurality of sheet types such as plain paper, middle-thick paper, and thick paper. It is to be noted that the control portion 7 may automatically sense the sheet type of a sheet stored in each of the sheet feed cassettes 4A on the basis of a result of sensing by an unillustrated sensing portion such as an optical sensor or a weight sensor.

The operation display portion 5 is a user interface of the image forming apparatus 100. The operation display portion 5 includes a display portion such as a liquid crystal display that displays various kinds of information in response to a control instruction from the control portion 7 and an operation portion such as an operation key or a touch panel that inputs various kinds of information to the control portion 7 in response to an operation of a user.

The storage portion 6 is a non-volatile storage device. For example, the storage portion 6 is a non-volatile memory such as a flash memory. It is to be noted that the storage portion 6 may be a solid state drive (SSD) or a hard disk drive (HDD).

The control portion 7 integrally controls the image forming apparatus 100. As shown in FIG. 2, the control portion 7 includes a CPU 11, a ROM 12, and a RAM 13. The CPU 11 includes one or more processors that execute various calculation processes. The ROM 12 is a non-volatile storage device in which information about a control program or the like for causing the CPU 11 to execute various processes is stored in advance. The RAM 13 is a volatile or non-volatile storage device that is used as a temporary storage memory (work area) for various processes which are executed by the CPU 11. The CPU 11 integrally controls the image forming apparatus 100 by executing various control programs stored in the ROM 12 in advance.

It is to be noted that the control portion 7 may be a control portion provided separately from a main control portion which integrally controls the image forming apparatus 100. In addition, the control portion 7 may include an electronic circuit such as an integrated circuit (ASIC).

[Configuration of Image Forming Portion 3]

Figure 3:
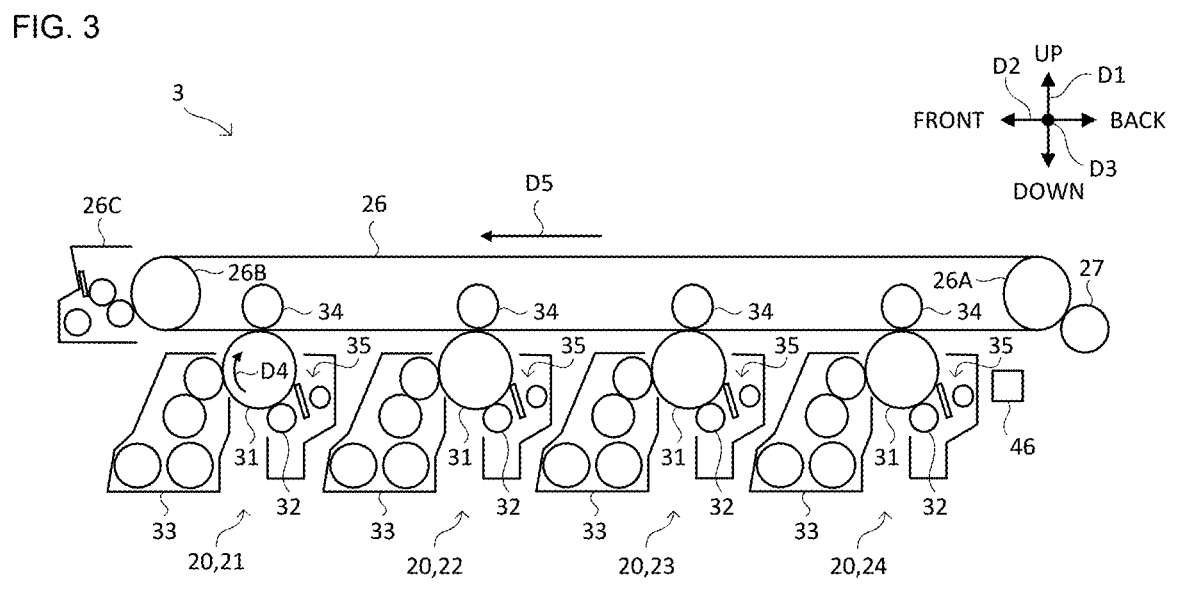

Next, the configuration of the image forming portion 3 will be described with reference to FIGS. 1 to 3. Here, FIG. 3 is a schematic diagram showing the configurations of an image forming unit 20, an intermediate transfer belt 26, and a secondary transfer roller 27. In addition, FIG. 3 is a bottom view of the configurations of a photoconductor drum 31, the intermediate transfer belt 26, a drive roller 26A, and the secondary transfer roller 27 of an image forming unit 24.

As shown in FIG. 1, the image forming portion 3 includes the four image forming units 20, a laser scanning unit 25, the intermediate transfer belt 26, the secondary transfer roller 27, a fixing device 28, and a sheet discharge tray 29. In addition, as shown in FIGS. 2 and 3, the image forming portion 3 includes four first power supplies 40, a second power supply 45, and a sensing portion 46.

The four image forming units 20 include image forming units 21 to 24 corresponding to a plurality of colors. The image forming unit 21 (see FIG. 3) forms a toner image of Y (yellow). The image forming unit 22 (see FIG. 3) forms a toner image of C (cyan). The image forming unit 23 (see FIG. 3) forms a toner image of M (magenta). The image forming unit 24 (see FIG. 3) forms a toner image of K (black). As shown in FIGS. 1 and 3, the four image forming units 20 are provided side by side along the front-back direction D2 in the order of yellow, cyan, magenta, and black from the front side of the image forming apparatus 100. Of the image forming units 20, the image forming unit 24 is used for monochrome printing and the image forming units 21 to 24 are used for color printing.

As shown in FIG. 3, each of the image forming units 20 includes the photoconductor drum 31, a charging roller 32, a developing device 33, a primary transfer roller 34, and a drum cleaning member 35. In addition, each of the image forming units 20 includes a toner container 36 shown in FIG. 1.

An electrostatic latent image is formed on a surface of the photoconductor drum 31. For example, the photoconductor drum 31 includes a photosensitive layer formed by using amorphous silicon. The photoconductor drum 31 receives rotational driving force supplied from an unillustrated motor and rotates in a drum rotation direction D4 shown in FIG. 3. This causes the photoconductor drum 31 to convey the electrostatic latent image formed on the surface.

The charging roller 32 receives the application of a charged voltage set in advance and charges the surface of the photoconductor drum 31. For example, the charging roller 32 charges the surface of the photoconductor drum 31 with positive polarity. The surface of the photoconductor drum 31 charged by the charging roller 32 is irradiated with light emitted from the laser scanning unit 25 and based on image data. This forms the electrostatic latent image on the surface of the photoconductor drum 31.

The developing device 33 develops the electrostatic latent image formed on the surface of the photoconductor drum 31. The developing device 33 includes a pair of stirring members, a magnet roller, and a developing roller. The pair of stirring members stirs a developer including a toner and a carrier and stored inside the developing device 33. For example, the toner included in the developer is charged with positive polarity by the friction with the carrier included in the developer. The magnet roller draws up the developer stirred by the pair of stirring members and supplies the toner included in the developer to the developing roller. The developing roller conveys the toner supplied from the magnet roller to the opposed position to the photoconductor drum 31. In addition, the developing roller receives the application of a developing bias voltage set in advance and supplies the photoconductor drum 31 with the toner conveyed to the opposed position. This selectively supplies the toner to an exposure region on the photoconductor drum 31 irradiated with the light emitted from the laser scanning unit 25 and develops the electrostatic latent image formed on the surface of the photoconductor drum 31. It is to be noted that the developing device 33 is supplied with the toner from the toner container 36.

The primary transfer roller 34 receives the supply of a primary transfer current set in advance and transfers a toner image formed on the surface of the photoconductor drum 31 to the outer peripheral surface of the intermediate transfer belt 26. As shown in FIG. 3, the primary transfer roller 34 is provided to be opposed to the photoconductor drum 31 across the intermediate transfer belt 26.

The drum cleaning member 35 removes a toner remaining on the surface of the photoconductor drum 31 after the primary transfer roller 34 transfers the toner image.

The laser scanning unit 25 emits the light based on the image data toward the surface of the photoconductor drum 31 of each of the image forming units 20.

The intermediate transfer belt 26 is an endless belt member to which the toner image formed on the surface of the photoconductor drum 31 of each of the image forming units 20 is transferred. For example, the intermediate transfer belt 26 is formed by using a resin material such as polyimide. The intermediate transfer belt 26 is stretched under predetermined tension by the drive roller 26A (see FIG. 3) and a stretching roller 26B (see FIG. 3). The drive roller 26A receives rotational driving force supplied from an unillustrated motor and rotates to cause the intermediate transfer belt 26 to rotate in a belt rotation direction D5 shown in FIG. 3. This causes the intermediate transfer belt 26 to convey the toner image transferred from each of the photoconductor drums 31 to a sheet transfer position by the secondary transfer roller 27. It is to be noted that the outer peripheral surface of the intermediate transfer belt 26 after the secondary transfer roller 27 transfers the toner images is cleaned by a belt cleaning member 26C (see FIG. 3).

The secondary transfer roller 27 receives the supply of a secondary transfer current set in advance and transfers the toner image transferred to the outer peripheral surface of the intermediate transfer belt 26 to a sheet supplied from the sheet feed portion 4. As shown in FIG. 3, the secondary transfer roller 27 is provided to be opposed to the drive roller 26A across the intermediate transfer belt 26.

The fixing device 28 fixes the toner image transferred to the sheet by the secondary transfer roller 27 onto the sheet.

The sheet onto which the fixing device 28 fixes the toner image is discharged to the sheet discharge tray 29.

Of the four first power supplies 40, a first power supply 41 (see FIG. 2) is a constant current power supply that supplies the primary transfer roller 34 of the image forming unit 21 with the primary transfer current. Of the four first power supplies 40, a first power supply 42 (see FIG. 2) is a constant current power supply that supplies the primary transfer roller 34 of the image forming unit 22 with the primary transfer current. Of the four first power supplies 40, a first power supply 43 (see FIG. 2) is a constant current power supply that supplies the primary transfer roller 34 of the image forming unit 23 with the primary transfer current. Of the four first power supplies 40, a first power supply 44 (see FIG. 2) is a constant current power supply that supplies the primary transfer roller 34 of the image forming unit 24 with the primary transfer current. Each of the first power supplies 40 supplies the primary transfer current set by the control portion 7 to the primary transfer roller 34. For example, the primary transfer current is a current having negative polarity.

The second power supply 45 is a constant current power supply that supplies the secondary transfer roller 27 with the secondary transfer current. The second power supply 45 supplies the secondary transfer current set by the control portion 7 to the secondary transfer roller 27. For example, the secondary transfer current is a current having negative polarity.

The sensing portion 46 is used to sense the density and the position of a toner image transferred onto the outer peripheral surface of the intermediate transfer belt 26. For example, the sensing portion 46 is a reflective photosensor including a light emitting portion that emits light toward the intermediate transfer belt 26 and a light receiving portion that receives light emitted from the light emitting portion and reflected by the intermediate transfer belt 26. The sensing portion 46 then inputs, to the control portion 7, an electrical signal corresponding to the density of the toner image to be sensed.

As shown in FIG. 3, the sensing portion 46 is disposed on the downstream side of the photoconductor drum 31 of the image forming unit 24 in the belt rotation direction D5 and the upstream side of the transfer position of the toner image by the secondary transfer roller 27 in the belt rotation direction D5. In addition, in a case where sensing toner images described below are formed outside a region in which a print image based on print target image data is formed on the intermediate transfer belt 26, the sensing portion 46 may be disposed on the downstream side of the transfer position of a toner image by the secondary transfer roller 27 in the belt rotation direction D5 and the upstream side of the cleaning position of the outer peripheral surface of the intermediate transfer belt 26 by the belt cleaning member 26C in the belt rotation direction D5.

[Configuration of Control Portion 7]

Next, the configuration of the control portion 7 will be described with reference to FIG. 2.

As shown in FIG. 2, the control portion 7 includes a print processing portion 50, a count processing portion 51, and an adjustment processing portion 52. Specifically, the ROM 12 of the control portion 7 stores a condition adjustment program in advance for causing the CPU 11 to function as each of the processing portions described above. The CPU 11 then functions as each of the processing portions described above by executing the condition adjustment program stored in the ROM 12.

It is to be noted that the condition adjustment program may be recorded in a computer-readable recording medium such as a CD, a DVD, and a flash memory, and read from the recording medium and stored in a storage device such as the storage portion 6. In addition, some or all of the print processing portion 50, the count processing portion 51, and the adjustment processing portion 52 may each include an electronic circuit such as an integrated circuit (ASIC).

The print processing portion 50 controls the image forming portion 3 including the image forming units 21 to 24 corresponding to a plurality of colors, and executes a print process such as monochrome printing of forming a monochrome image on a sheet on the basis of input image data or color printing of forming a color image on the sheet on the basis of the input image data. Specifically, the print processing portion 50 controls the laser scanning unit 25 on the basis of the print target image data and forms an electrostatic latent image corresponding to each color on the photoconductor drum 31 of each of the image forming units 20 at a timing set in advance. This develops the electrostatic latent images formed on the photoconductor drums 31 as toner images in the respective image forming units 20 and the toner images are sequentially transferred to the intermediate transfer belt 26. After that, a color image or a monochrome image formed on the intermediate transfer belt 26 is transferred to a sheet by the secondary transfer roller 27 and the intermediate transfer belt 26 is cleaned by the belt cleaning member 26C.

It is to be noted that the print processing portion 50 controls the amount of laser light radiated by the laser scanning unit 25 in the print process on the basis of input and output characteristics indicating the relationship between the input image data and the amount of light radiated by the laser scanning unit 25 and the image data. In addition, the print processing portion 50 controls the developing bias voltage of each of the image forming units 20 in the print process such that the developing bias voltage has a value set in advance for each of the image forming units 20. Furthermore, the print processing portion 50 also controls the charged voltage of each of the image forming units 20, the primary transfer current, the secondary transfer current of the secondary transfer roller 27, and the like in the print process.

In addition, the print processing portion 50 allows the line speed of the image forming portion 3 to be changed depending on the sheet type (such as plain paper, middle-thick paper, or thick paper) of a sheet to be used for the print process, the printing type (monochrome printing or color printing) of the print process, and the like. The line speed is the operation speed (surface movement speed) of a transfer destination object such as the intermediate transfer belt 26. The print processing portion 50 changes the line speed by coordinating the rotation speed of the drive roller 26A that drives the intermediate transfer belt 26. Additionally, for example, in a case where the image forming portion 3 is not provided with the intermediate transfer belt 26 and a toner image is transferred to a sheet from each of the photoconductor drums 31, the line speed may be the conveyance speed of the sheet.

The print processing portion 50 is capable of determining the sheet type (such as plain paper, middle-thick paper, or thick paper) of a sheet to be used for the print process depending on the sheet feed cassette 4A to be used for the print process. In addition, the print processing portion 50 may determine the sheet type of a sheet to be used for a print process based on print target image data on the basis of a printing condition set for the print process of the image data through a user operation.

The print processing portion 50 is capable of automatically determining whether the printing type of the print process is monochrome printing or color printing on the basis of the image data. In addition, the print processing portion 50 may determine whether the printing type of the print process is monochrome printing or color printing on the basis of a printing condition set for the print process of the image data through a user operation.

Specifically, in this embodiment, line speed association information (see FIG. 4) in which the association between a plurality of line speed modes and a plurality of sheet types set in advance is defined in advance is stored in the storage portion 6. Specifically, as shown in FIG. 4, in the line speed association information used in this embodiment, the line speed modes include a full-speed mode, a middle-speed mode, and a half-speed mode. The full-speed mode is then associated with the sheet type "plain paper", the middle-speed mode is associated with the sheet type "middle-thick paper", and the half-speed mode is associated with the sheet type "thick paper". It is to be noted that each of the line speed modes may be associated with a plurality of sheet types. For example, sheet types associated with the full-speed mode may be the two types "plain paper" and "color paper". It is to be noted that each of the sheet types is associated with any of the line speed modes in advance depending on the basis weight of the sheet.

In addition, as shown in FIG. 4, in the line speed association information, the association between a plurality of line speed modes and a plurality of printing types is defined. Specifically, in the line speed association information, the full-speed mode is associated with a line speed "M1" in the case of the printing type "monochrome printing", and associated with a line speed "C1" in the case of the printing type "color printing". In addition, the middle-speed mode is associated with a line speed "M2" in the case of the printing type "monochrome printing", and associated with a line speed "C2" in the case of the printing type "color printing". Furthermore, the half-speed mode is associated with a line speed "M3" in the case of the printing type "monochrome printing", and associated with a line speed "C3" in the case of the printing type "color printing".

In this way, the line speed is stored in the line speed association information in association with each of combinations of the line speed modes and the printing types. The print processing portion 50 then changes the line speed of the image forming portion 3 in a print process on the basis of the line speed association information and a combination of the sheet type of a sheet to be used for the print process and the printing type of the print process.

It is to be noted that the line speeds "M1" to "M3" have a relationship of M1>M2>M3 and the line speeds "C1" to "C3" have a relationship of C1>C2>C3. In addition, the line speeds "M1" to "M3" and the line speeds "C1" to "C3" have a relationship of M1>C1, M2>C2, M3>C3. Additionally, it is possible that the difference in line speed between monochrome printing and color printing in the same line speed mode is smaller than the difference in line speed between the monochrome printings in the different line speed modes. Similarly, it is possible that the difference in line speed between monochrome printing and color printing in the same line speed mode is smaller than the difference in line speed between the color printings in the different line speed modes. That is, a change of the line speed made by a change of the printing type is smaller than a change of the line speed made by a change of the line speed mode.

In a case where a start condition set in advance is satisfied, the count processing portion 51 starts to count a count value indicating elapsed time. Specifically, in a case where the series of print processes of forming images on a plurality of sheets on the basis of image data corresponding to one print job is started by the print processing portion 50, the count processing portion 51 starts to count a print count value indicating the elapsed time of the print processes. In a case where print processes for a plurality of sheets in a plurality of jobs are executed in series by the print processing portion 50, the print count value may be the elapsed time of the series of print processes executed in series. It is to be noted that the count processing portion 51 resets the print count value to 0, for example, whenever the series of print processes is started or in a case where the image forming apparatus 100 refrains from executing a print process for a predetermined time set in advance. In addition, in a case where the adjustment processing portion 52 executes a color adjustment process described below, the count processing portion 51 starts to count an interval count value indicating the time elapsed from the execution time point (the execution start time point or the execution end time point) of the color adjustment process to the current time point.

In addition, the count processing portion 51 may count a count value indicating the number of copies instead of the elapsed time or along with the elapsed time. Specifically, in a case where the print processes of forming images on one or more sheets on the basis of image data corresponding to one print job are started by the print processing portion 50, the count processing portion 51 may start to count a print count value indicating the number of copies of the print processes. In addition, in a case where the adjustment processing portion 52 executes a color adjustment process described below, the count processing portion 51 may start to count an interval count value indicating the number of copies from the execution time point (the execution start time point or the execution end time point) of the color adjustment process to the current time point.

In a case where the line speed mode, the printing type, or the like of a print process to be executed by the print processing portion 50 is changed to change the line speed of the image forming portion 3, the adjustment processing portion 52 allows a condition adjustment process of adjusting an image formation condition of the image forming portion 3 to be executed. Specifically, in a case where the printing type of a print process to be executed by the print processing portion 50 is changed from one of monochrome printing and color printing to the other to change the line speed, the adjustment processing portion 52 executes the condition adjustment process before the execution of monochrome printing or color printing (inter-sheet) subsequent to the change of the printing type. In addition, in another embodiment, the condition adjustment process may be executed in parallel with the print process.

Additionally, in a case where the print process to be executed after the change of the line speed is monochrome printing, the condition adjustment process is executed on only the image forming unit 24 to be used for the monochrome printing. In addition, in a case where the print process to be executed after the change of the line speed is color printing, the condition adjustment processes are executed on the image forming units 21 to 24 to be used for the color printing. Furthermore, as another embodiment, in a case where the print process to be executed after the change of the line speed is any of monochrome printing and color printing, it is possible that the condition adjustment processes are executed on the image forming units 21 to 24 to be used for the color printing.

In the condition adjustment process, the adjustment processing portion 52 controls the image forming portion 3 to form one or more sensing toner images based on sensing image data set in advance on the intermediate transfer belt 26 by each of the image forming units 20 to be adjusted at the line speed of the print process to be executed after the change of the printing type. The adjustment processing portion 52 then uses the sensing portion 46 to sense the density and the position of each of the sensing toner images formed on the intermediate transfer belt 26. After that, the adjustment processing portion 52 adjusts the density and the position of a toner image to be formed by each of the image forming units 20 by adjusting an image formation condition of the image forming portion 3 on the basis of results of the sensing of the density and the position of the sensing toner image. For example, the image formation condition includes the developing bias voltage, the amount of laser light of the laser scanning unit 25, an image formation position by the laser scanning unit 25, an image writing timing, input and output characteristics (gamma characteristics), and the like. It is to be noted that the image formation condition may include the charged voltage, the primary transfer current, and the secondary transfer current.

Incidentally, in a case where the condition adjustment process is executed before the execution of a print process subsequent to the change of the line speed of the image forming portion 3, the print process is started with delay and the productivity (printing efficiency) of the image forming apparatus is thus decreased. Meanwhile, unless the condition adjustment process is executed before the execution of a print process subsequent to the change of the line speed of the image forming portion 3, the stabilization of the image quality of the image forming apparatus 100 may be impaired. In contrast, the image forming apparatus 100 according to this embodiment makes it possible to increase the productivity of the image forming apparatus 100 and stabilize the image quality in a well-balanced manner as described below.

Specifically, it is possible in the image forming apparatus 100 for the control portion 7 to select any of a plurality of operation modes having different execution conditions for the condition adjustment processes in response to a user operation in the initial settings or the like of the image forming apparatus 100. In this embodiment, the operation modes include a first operation mode to a five operation mode. The control portion 7 then determines in a condition adjustment control process described below whether or not it is necessary to execute the condition adjustment process in accordance with the operation mode selected in advance.

In particular, even in a case where the printing type is changed, the control portion 7 allows the execution of the condition adjustment process in the image forming apparatus 100 according to this embodiment to be restricted in a case where the line speed mode is the same before and after the change of the printing type and a restriction condition set in advance for each of the operation modes is satisfied. Specifically, the restriction on the execution of the condition adjustment process includes refraining from executing the condition adjustment process, executing only some of the condition adjustment processes, or the like.

Additionally, it is sufficient in another embodiment if any one or more of the first operation mode to the five operation mode are executable in the image forming apparatus 100. In addition, it may be possible in the image forming apparatus 100 to select an operation mode having a different determination criterion of the execution necessity of the condition adjustment process in addition to the first operation mode to the five operation mode.

[Condition Adjustment Control Process]

An example of a procedure (image forming method) of a condition adjustment control process to be executed by the adjustment processing portion 52 of the control portion 7 in a case where any of the first operation mode to the five operation mode is selected in the image forming apparatus 100 will be described below with reference to FIGS. 5 to 9. In addition, this disclosure may be grasped as an image forming method in which the control portion 7 executes each of steps of the condition adjustment control process corresponding to any one or more of the first operation mode to the five operation mode. It is to be noted that steps S11, S12, . . . denote the numbers of processing procedures (steps) that are executed by the control portion 7.

The condition adjustment control process is executed by the control portion 7 whenever an image forming operation corresponding to one sheet on the intermediate transfer belt 26 comes to an end in a case where print processes on a plurality of sheets in one job are being executed in series by the print processing portion 50. Then, in a case where the series of print processes on the plurality of sheets in the one job is executed in series, monochrome printing and color printing are mixed in the series of print processes, and monochrome printing and color printing are switched in the series of print processes in some cases. In addition, the condition adjustment control process may be executed by the control portion 7 whenever an image forming operation corresponding to each of sheets on the intermediate transfer belt 26 comes to an end in a case where print processes on a plurality of sheets in a plurality of jobs are being executed in series by the print processing portion 50. In this case, in a case where the series of print processes on the plurality of sheets in the plurality of jobs is executed in series, monochrome printing and color printing are also mixed in the series of print processes, and monochrome printing and color printing are switched in the series of print processes in some cases. After that, the print processing portion 50 starts an image forming operation on the intermediate transfer belt 26 in a print process corresponding to the next one sheet in a case where the condition adjustment control process comes to an end. In addition, in a case where the condition adjustment process is executed in the condition adjustment control process, the print processing portion 50 starts an image forming operation on the intermediate transfer belt 26 in a print process corresponding to the next one sheet after the execution of the condition adjustment process.

[Condition Adjustment Control Process in First Operation Mode]

Figure 5:
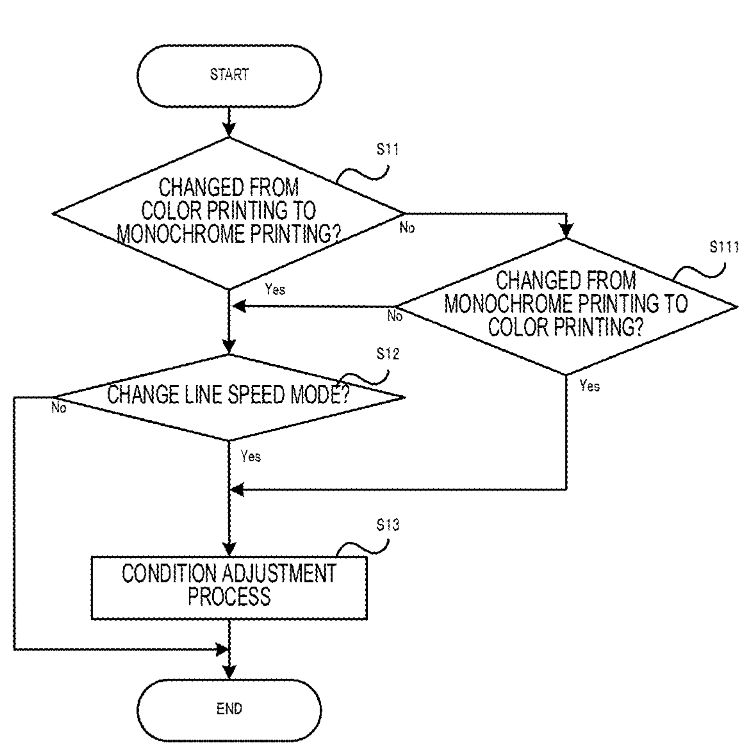
FIG. 5 is a flowchart showing an example of an adjustment control process that is executed by the image forming apparatus according to the embodiment of this disclosure.

First, a condition adjustment process in a case where the operation mode of the image forming apparatus 100 is the first operation mode will be described with reference to FIG. 5.

The restriction condition in the first operation mode is for the printing type to be changed from color printing to monochrome printing.

<Step S11>

In step S11, the adjustment processing portion 52 of the control portion 7 determines whether or not the printing type of a print process to be executed by the print processing portion 50 is changed from color printing to monochrome printing. Specifically, in a case where the printing type of the last print process is color printing and the printing type of the next print process is monochrome printing, the adjustment processing portion 52 determines that the printing type is changed from color printing to monochrome printing. Here, when it is determined that the printing type is changed from color printing to monochrome printing (S11: Yes), the process transitions to step S12. In contrast, when it is determined that the printing type is not changed from color printing to monochrome printing (S11: No), the process transitions to step S111.

<Step S12>

In step S12, the adjustment processing portion 52 of the control portion 7 determines whether or not the line speed mode is changed. Specifically, in a case where the line speed mode of the last print process and the line speed mode of the next print process are different, the adjustment processing portion 52 determines that the line speed mode is changed. For example, in a case where a sheet used for the last print process is plain paper corresponding to the full-speed mode and a sheet to be used for the next print process is thick paper corresponding to the half-speed mode, it is determined that the line speed mode is changed. Here, when it is determined that the line speed mode is changed (S12: Yes), the process transitions to step S13. When it is determined that the line speed mode is not changed (S12: No), the condition adjustment control process comes to an end.

<Step S111>

In addition, in step S111, the adjustment processing portion 52 of the control portion 7 determines whether or not the printing type is changed from monochrome printing to color printing. Specifically, in a case where the printing type of the last print process is monochrome printing and the printing type of the next print process is color printing, the adjustment processing portion 52 determines that the printing type is changed from monochrome printing to color printing. Here, when it is determined that the printing type is changed from monochrome printing to color printing (S111: Yes), the process transitions to step S13. In contrast, when it is determined that the printing type is not changed from monochrome printing to color printing (S111: No), the process transitions to step S12.

<Step S13>

In step S13, the adjustment processing portion 52 of the control portion 7 executes the condition adjustment process. After the condition adjustment process comes to an end, the adjustment processing portion 52 of the control portion 7 ends the condition adjustment control process. Specifically, in a case where the printing type of the next print process is monochrome printing, the adjustment processing portion 52 executes a monochrome adjustment process corresponding to the monochrome printing as the condition adjustment process. Here, in a case where the printing type of the next print process is color printing, the adjustment processing portion 52 executes a color adjustment process corresponding to the color printing as the condition adjustment process. In the color adjustment process, the image formation conditions are adjusted for all the respective image forming units 20. Meanwhile, in a case where the printing type of the next print process is monochrome printing, the adjustment processing portion 52 executes a monochrome adjustment process corresponding to the monochrome printing as the condition adjustment process. In the monochrome adjustment process, the image formation condition is adjusted for only the image forming unit 24 of K (black) among the image forming units 20.

In this way, in a case where the printing type is changed from color printing to monochrome printing and the line speed mode is changed, the adjustment processing portion 52 executes the condition adjustment process in the first operation mode. In addition, in a case where the printing type is changed from monochrome printing to color printing, the adjustment processing portion 52 also executes the condition adjustment processes in the first operation mode. Furthermore, even in a case where the printing type is not changed from monochrome printing to color printing, the adjustment processing portion 52 executes the condition adjustment process in the first operation mode in a case where the line speed mode is changed.

Meanwhile, even in a case where the printing type is changed from color printing to monochrome printing, the adjustment processing portion 52 does not execute the condition adjustment process in the first operation mode in a case where the line speed mode is not changed. In a case where the printing type is changed from color printing to monochrome printing and the line speed mode is not changed, it is therefore possible in the first operation mode to increase the productivity of the image forming apparatus 100 in comparison with a case where the condition adjustment process is executed. In addition, in a case where the printing type is changed from monochrome printing to color printing or in a case where the line speed mode is changed, the condition adjustment process is executed to stabilize the image quality in the first operation mode.

Additionally, in a case where the printing type is changed from monochrome printing to color printing (S111: Yes), the adjustment processing portion 52 of the control portion 7 executes the condition adjustment processes in the first operation mode in this embodiment (S13). Meanwhile, in another embodiment, in a case where the printing type is changed from monochrome printing to color printing (S111: Yes), the condition adjustment processes do not have to be executed in the first operation mode.

[Condition Adjustment Control Process in Second Operation Mode]

Figure 6:
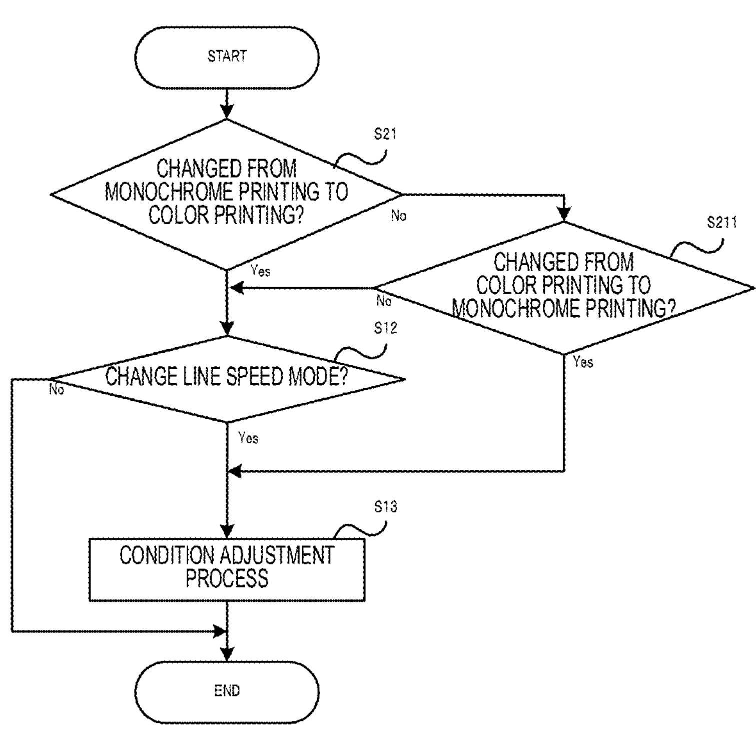
FIG. 6 is a flowchart showing an example of the adjustment control process that is executed by the image forming apparatus according to the embodiment of this disclosure.

Next, a condition adjustment process in a case where the operation mode of the image forming apparatus 100 is the second operation mode will be described with reference to FIG. 6. It is to be noted that a process similar to the condition adjustment process of FIG. 5 will be denoted by the same reference sign and description thereof will be omitted in FIG. 6.

The restriction condition in the second operation mode is for the printing type to be changed from monochrome printing to color printing.

<Step S21>

In step S21, the adjustment processing portion 52 of the control portion 7 determines whether or not the printing type is changed from monochrome printing to color printing as in step S111. Here, when it is determined that the printing type is changed from monochrome printing to color printing (S21: Yes), the process transitions to step S12. In contrast, when it is determined that the printing type is not changed from monochrome printing to color printing (S21: No), the process transitions to step S211.

<Step S211>

In step S211, the adjustment processing portion 52 of the control portion 7 determines whether or not the printing type is changed from color printing to monochrome printing as in step S11. Here, when it is determined that the printing type is changed from monochrome printing to color printing (S211: Yes), the process transitions to step S13. In contrast, when it is determined that the printing type is not changed from monochrome printing to color printing (S211: No), the process transitions to step S12.

In this way, in a case where the printing type is changed from monochrome printing to color printing and the line speed mode is changed, the adjustment processing portion 52 executes the condition adjustment processes in the second operation mode. In addition, in a case where the printing type is changed from color printing to monochrome printing, the adjustment processing portion 52 also executes the condition adjustment process in the second operation mode. Furthermore, even in a case where the printing type is not changed from color printing to monochrome printing, the adjustment processing portion 52 executes the condition adjustment processes in the second operation mode in a case where the line speed mode is changed.

Meanwhile, even in a case where the printing type is changed from monochrome printing to color printing, the adjustment processing portion 52 does not execute the condition adjustment processes in the second operation mode in a case where the line speed mode is not changed. Therefore, in a case where the printing type is changed from monochrome printing to color printing and the line speed mode is not changed, it is also possible in the second operation mode to increase the productivity of the image forming apparatus 100 in comparison with a case where the condition adjustment processes are executed. In addition, in a case where the printing type is changed from color printing to monochrome printing or in a case where the line speed mode is changed, the condition adjustment process is executed to stabilize the image quality in the second operation mode.

Additionally, in a case where the printing type is changed from color printing to monochrome printing (S211: Yes), the adjustment processing portion 52 of the control portion 7 executes the condition adjustment process in the second operation mode in this embodiment (S13). Meanwhile, in another embodiment, in a case where the printing type is changed from color printing to monochrome printing (S211: Yes), the condition adjustment process does not have to be executed in the second operation mode.

[Condition Adjustment Control Process in Third Operation Mode]

Next, a condition adjustment process in a case where the operation mode of the image forming apparatus 100 is the third operation mode will be described with reference to FIG. 7. It is to be noted that a process similar to the condition adjustment process of FIG. 5 will be denoted by the same reference sign and description thereof will be omitted in FIG. 7.

The restriction condition in the third operation mode is for the printing type to be changed from color printing to monochrome printing and for the execution time of monochrome printing executed before the change of the printing type not to reach a first setting value set in advance. The first setting value is, for example, time set in advance such as two minutes or five minutes.

<Step S112>

Figure 7:
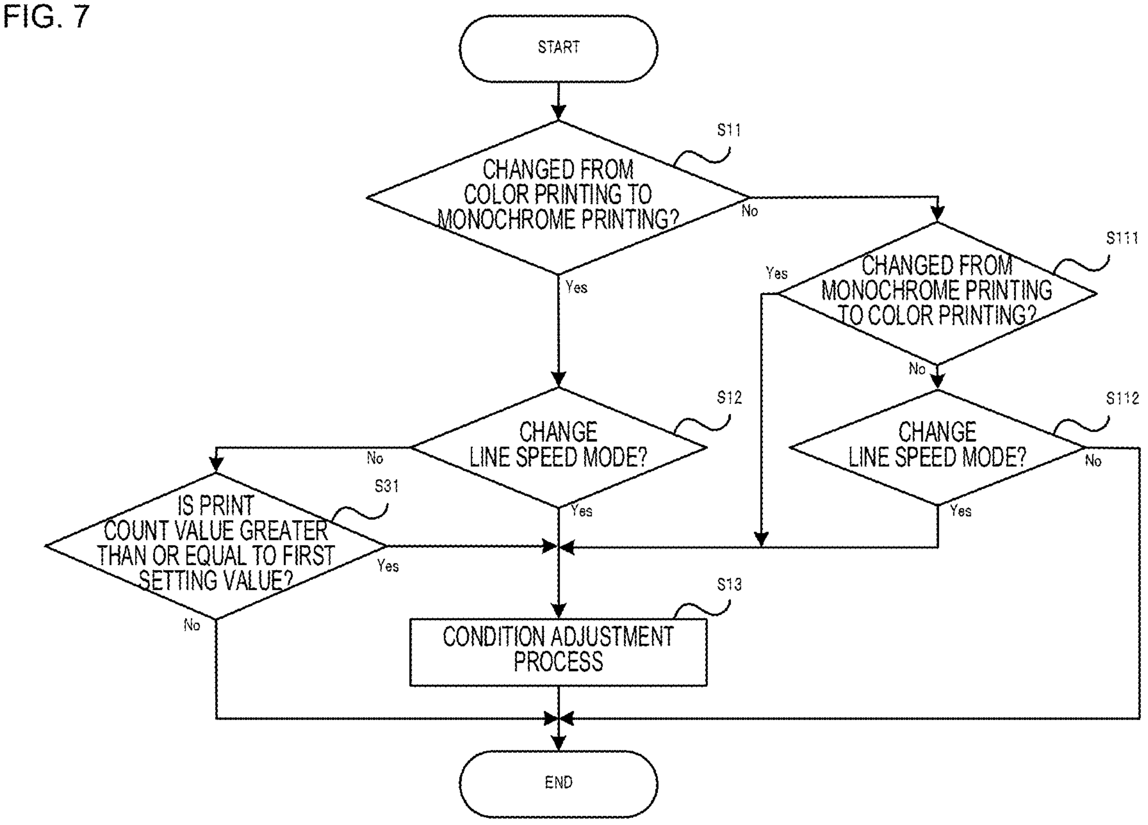
FIG. 7 is a flowchart showing an example of the adjustment control process that is executed by the image forming apparatus according to the embodiment of this disclosure.

As shown in FIG. 7, in the condition adjustment control process corresponding to the third operation mode, in a case where it is determined in step S111 that the printing type is changed from monochrome printing to color printing (S111: Yes), the process transitions to step S13. In a case where it is determined that the printing type is not changed from monochrome printing to color printing (S111: No), the process transitions to step S112. In step S112, the adjustment processing portion 52 of the control portion 7 then determines whether or not the line speed mode is changed as in step S12. Here, when it is determined that the line speed mode is changed (S112: Yes), the process transitions to step S13. When it is determined that the line speed mode is not changed (S112: No), the condition adjustment control process comes to an end.

<Step S31>

In addition, as shown in FIG. 7, in the condition adjustment control process corresponding to the third operation mode, when it is determined in step S12 that the line speed mode is not changed (S12: No), the process transitions to step S31. In step S31, the adjustment processing portion 52 of the control portion 7 then determines whether or not the print count value counted by the count processing portion 51 reaches a first setting value set in advance. The first setting value is a value set in advance as a condition for restricting the execution of the condition adjustment process in a case where the printing type is changed from color printing to monochrome printing and the line speed mode is not changed.

It is to be noted that the print count value is, as described above, a value at which the count processing portion 51 starts counting in a case where the print process is started. The print count value indicates the printing time of the print process. When it is then determined that the print count value reaches the first setting value (S31: Yes), the process transitions to step S13. In contrast, when it is determined that the print count value does not reach the first setting value (S31: No), the condition adjustment control process comes to an end.

In this way, in a case where the printing type is changed from color printing to monochrome printing and the line speed mode is not changed, the adjustment processing portion 52 refrains, in the third operation mode, from executing the condition adjustment process before the period corresponding to the first setting value passes. This prevents the condition adjustment process from being executed and prevents the productivity from significantly decreasing in a case where the total necessary time of the print process is short. Meanwhile, even in a case where the printing type is changed from color printing to monochrome printing and the line speed mode is not changed, the adjustment processing portion 52 executes the condition adjustment process in the third operation mode in a case where the period corresponding to the first setting value passes. This executes the condition adjustment process and stabilizes the image quality in a case where the total necessary time of the print process is long.

Additionally, in a case where the print process is started, the count processing portion 51 may start to count a print count value indicating the number of copies of the print process. In step S31, the adjustment processing portion 52 may then determine whether or not the print count value indicating the number of copies reaches the setting number of copies set in advance. That is, the restriction condition in the third operation mode may be for the printing type to be changed from color printing to monochrome printing and for the number of copies of monochrome printing executed before the change of the printing type not to reach a first setting value set in advance. The first setting value is, for example, the number of copies such as 100 copies or 200 copies.

Furthermore, in a case where the print process is started, the count processing portion 51 may start to count together a first print count value and a second print count value indicating the elapsed time and the number of copies of the print process. It is then considered that a first time setting value is set in advance as the first setting value corresponding to the first print count value and a first number-of-copies setting value is set in advance as the first setting value corresponding to the second print count value. In this case, the adjustment processing portion 52 may cause the process to transition to step S13 in a case where at least any one of the first print count value reaching the first time setting value and the second print count value reaching the first number-of-copies setting value is satisfied in step S31.

[Condition Adjustment Control Process in Fourth Operation Mode]

Next, a condition adjustment process in a case where the operation mode of the image forming apparatus 100 is the fourth operation mode will be described with reference to FIG. 8. It is to be noted that a process similar to the condition adjustment process of FIG. 6 will be denoted by the same reference sign and description thereof will be omitted in FIG. 8.

The restriction condition in the fourth operation mode is for the printing type to be changed from monochrome printing to color printing and for the time elapsed from the execution of the last color adjustment process not to reach a second setting value set in advance. The second setting value is, for example, time set in advance such as two minutes or five minutes.

<Step S212>

Figure 8:
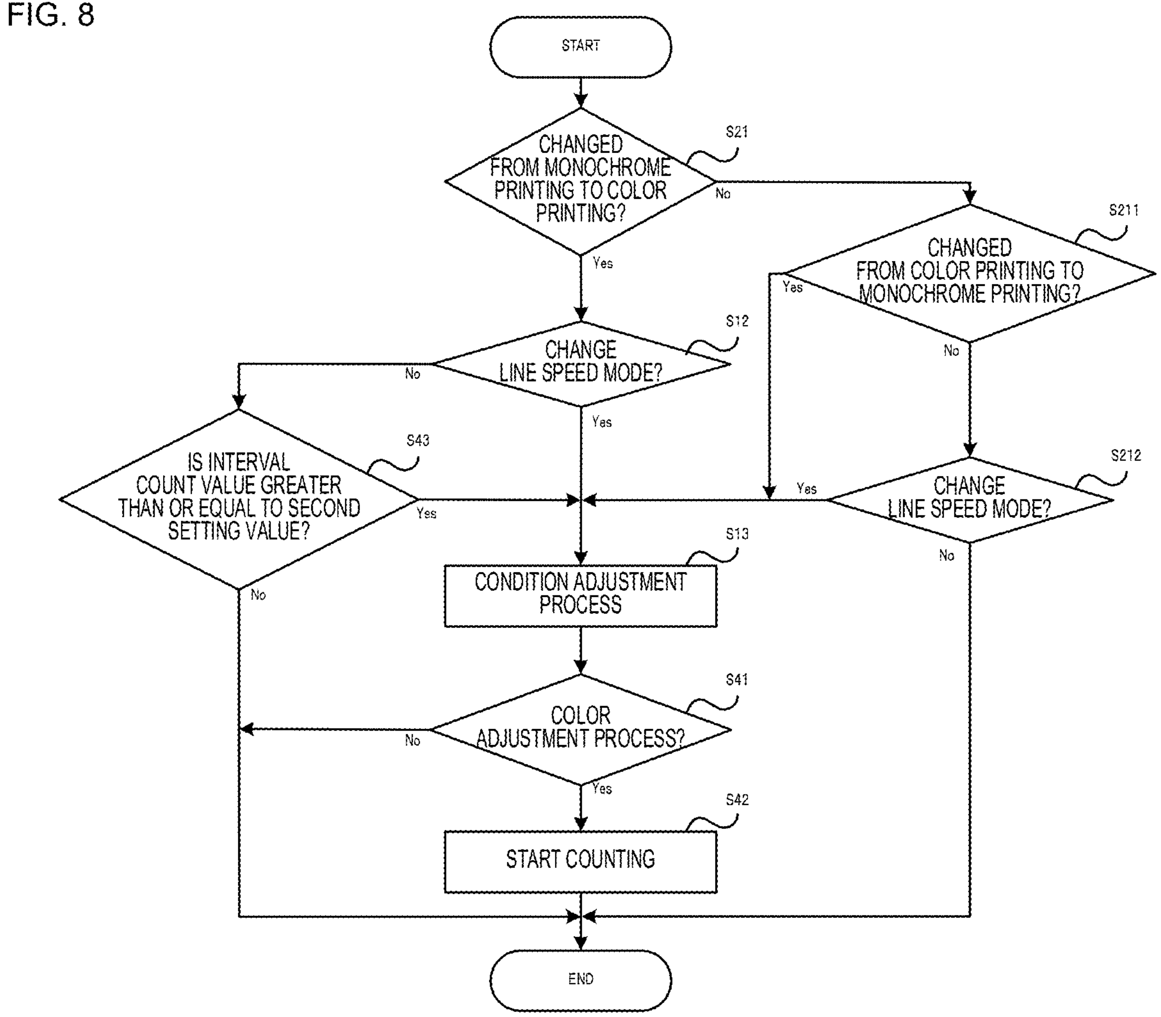
FIG. 8 is a flowchart showing an example of the adjustment control process that is executed by the image forming apparatus according to the embodiment of this disclosure.

As shown in FIG. 8, in the condition adjustment control process corresponding to the fourth operation mode, in a case where it is determined in step S211 that the printing type is changed from color printing to monochrome printing (S211: Yes), the process transitions to step S13. In a case where it is determined that the printing type is not changed from color printing to monochrome printing (S211: No), the process transitions to step S212. In step S212, the adjustment processing portion 52 of the control portion 7 then determines whether or not the line speed mode is changed as in step S12. Here, when it is determined that the line speed mode is changed (S212: Yes), the process transitions to step S13. When it is determined that the line speed mode is not changed (S212: No), the condition adjustment control process comes to an end.

<Step S41>

In addition, as shown in FIG. 8, in the condition adjustment control process corresponding to the fourth operation mode, when the condition adjustment process is executed in step S13, the process transitions to step S41. In step S41, the adjustment processing portion 52 of the control portion 7 then determines whether or not the condition adjustment process executed in step S13 is the color adjustment process. Here, when it is determined that the condition adjustment process is the color adjustment process (S41: Yes), the process transitions to step S42. When it is determined that the condition adjustment process is not the color adjustment process (S41: No), the condition adjustment control process comes to an end.

<Step S42>

In step S42, the count processing portion 51 of the control portion 7 starts to count an interval count value indicating the time elapsed from the execution of the last color adjustment process in step S13. That is, the elapsed time is the time elapsed from the execution of the color adjustment process on each of the image forming units 21 to 24 used for color printing. Additionally, in a case where the count processing portion 51 has started to count the interval count value, the count value is reset to 0 and the count value starts to be counted again.

<Step S43>

In addition, as shown in FIG. 8, in the condition adjustment control process corresponding to the fourth operation mode, when it is determined in step S12 that the line speed mode is not changed (S12: No), the process transitions to step S43. In step S43, the adjustment processing portion 52 of the control portion 7 then determines whether or not the interval count value counted in step S42 reaches a second setting value set in advance. The second setting value is a value set in advance as a condition for restricting the execution of the condition adjustment process in a case where the printing type is changed from color printing to monochrome printing and the line speed mode is not changed. When it is then determined that the interval count value reaches the second setting value (S43: Yes), the process transitions to step S13. In contrast, when it is determined that the interval count value does not reach the second setting value (S43: No), the condition adjustment control process comes to an end.

In this way, in a case where the printing type is changed from monochrome printing to color printing and the line speed mode is not changed, the adjustment processing portion 52 refrains, in the fourth operation mode, from executing the condition adjustment processes before the period corresponding to the second setting value passes. This prevents the color adjustment process from being frequently executed even if monochrome printing and color printing are frequently switched. In addition, even in a case where the printing type is changed from monochrome printing to color printing and the line speed mode is not changed, the adjustment processing portion 52 executes the condition adjustment processes in the fourth operation mode in a case where the period corresponding to the second setting value passes. This stabilizes the image quality by executing the color adjustment process in a case where the period corresponding to the second setting value passes after the execution of the color adjustment process.

Additionally, in a case where the color adjustment process is executed, the count processing portion 51 may start to count the interval count value indicating the number of copies after the execution of the color adjustment process. In step S43, the adjustment processing portion 52 may then determine whether or not the interval count value indicating the number of copies reaches the setting number of copies set in advance. That is, the restriction condition in the third operation mode is for the printing type to be changed from monochrome printing to color printing and for the number of copies after the execution of the last color adjustment process not to reach a second setting value set in advance. The second setting value is, for example, the number of copies such as 100 copies or 200 copies.

Furthermore, in a case where the print process is started, the count processing portion 51 may start to count together a first interval count value and a second interval count value indicating the elapsed time and the number of copies of the print process. It is then considered that a second time setting value is set in advance as the second setting value corresponding to the first interval count value and a second number-of-copies setting value is set in advance as the second setting value corresponding to the second interval count value. In this case, the adjustment processing portion 52 may cause the process to transition to step S13 in a case where at least any one of the first interval count value reaching the second time setting value and the second interval count value reaching the second number-of-copies setting value is satisfied in step S43.

[Condition Adjustment Control Process in Fifth Operation Mode]

Next, a condition adjustment process in a case where the operation mode of the image forming apparatus 100 is the fifth operation mode will be described with reference to FIG. 9. It is to be noted that a process similar to the condition adjustment process of FIG. 8 will be denoted by the same reference sign and description thereof will be omitted in FIG. 9.

<Step S51>

Figure 9:
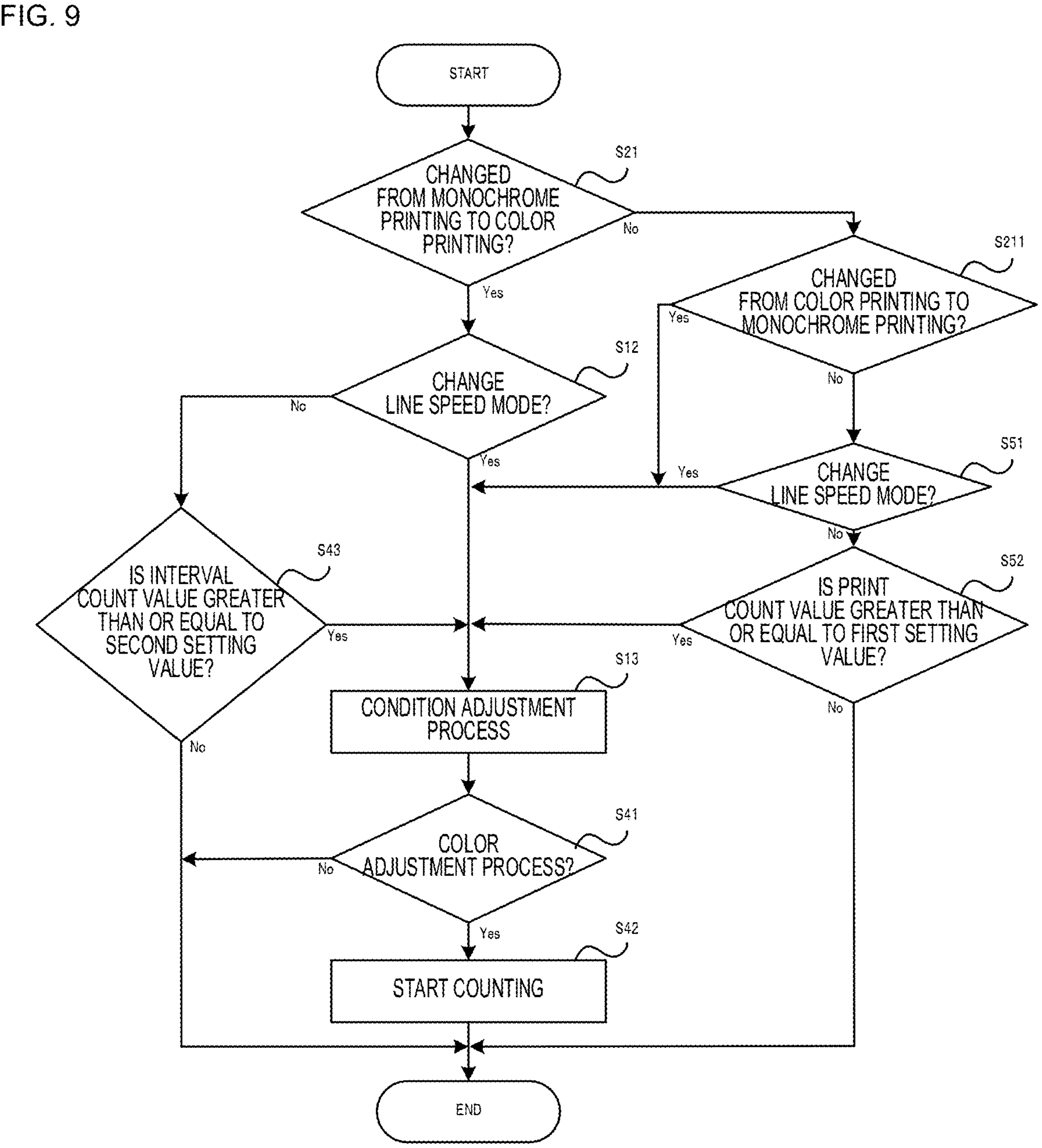
FIG. 9 is a flowchart showing an example of the adjustment control process that is executed by the image forming apparatus according to the embodiment of this disclosure.

In the condition adjustment process shown in FIG. 9, in a case where it is determined in step S211 that the printing type is changed from color printing to monochrome printing (S211: Yes), the process transitions to step S51. In step S51, the adjustment processing portion 52 of the control portion 7 then determines whether or not the line speed mode is changed as in step S12. Here, when it is determined that the line speed mode is changed (S51: Yes), the process transitions to step S13. When it is determined that the line speed mode is not changed (S51: No), the process transitions to step S52.

<Step S52>

In step S52, the adjustment processing portion 52 of the control portion 7 determines whether or not the print count value counted by the count processing portion 51 reaches a first setting value set in advance as in step S31 (see FIG. 7). When it is then determined that the print count value reaches the first setting value (S52: Yes), the process transitions to step S13. In contrast, when it is determined that the print count value does not reach the first setting value (S52: No), the condition adjustment control process comes to an end.

In this way, in a case where the printing type is changed from color printing to monochrome printing and the line speed mode is not changed, the adjustment processing portion 52 refrains, in the fifth operation mode, from executing the condition adjustment process before the period corresponding to the first setting value passes. This prevents the condition adjustment process from being executed and prevents the productivity from significantly decreasing in a case where the total necessary time of the print process is short. Meanwhile, even in a case where the printing type is changed from color printing to monochrome printing and the line speed mode is not changed, the adjustment processing portion 52 executes the condition adjustment process in the fifth operation mode in a case where the period corresponding to the first setting value passes. This executes the condition adjustment process and stabilizes the image quality in a case where the total necessary time of the print process is long.

In addition, in a case where the printing type is changed from monochrome printing to color printing and the line speed mode is not changed, the adjustment processing portion 52 refrains, in the fifth operation mode, from executing the condition adjustment processes before the period corresponding to the second setting value passes. This prevents the color adjustment process from being frequently executed even if monochrome printing and color printing are frequently switched. In addition, even in a case where the printing type is changed from monochrome printing to color printing and the line speed mode is not changed, the adjustment processing portion 52 executes the condition adjustment processes in the fifth operation mode in a case where the period corresponding to the second setting value passes. This stabilizes the image quality by executing the color adjustment process in a case where the period corresponding to the second setting value passes after the execution of the color adjustment process.

Supplementary Notes of Invention

The gist of the invention extracted from the embodiment described above will be supplementarily noted below. It is to be noted that the respective configurations and the respective processing functions described in the following supplementary notes can be sorted out and used in any combination.

<Supplementary Note 1>

An image forming apparatus including:

a print processing portion configured to control an image forming portion including image forming units corresponding to a plurality of colors, and execute monochrome printing of forming a monochrome image on a sheet on the basis of input image data or color printing of forming a color image on the sheet on the basis of the input image data; and an adjustment processing portion configured to allow, in a case where a printing type of a print process to be executed by the print processing portion is changed from one of the monochrome printing and the color printing to another, a condition adjustment process of adjusting an image formation condition of the image forming portion to be executed before execution of the monochrome printing or the color printing subsequent to a change of the printing type, in which the print processing portion allows line speed of the image forming portion to be changed depending on a combination of a line speed mode and the printing type set in advance in association with a sheet type of the sheet, and the adjustment processing portion allows execution of the condition adjustment process to be restricted in a case where the line speed mode is identical before and after a change of the printing type and a restriction condition set in advance is satisfied.

<Supplementary Note 2>

The image forming apparatus according to Supplementary Note 1, in which the restriction condition is for the printing type to be changed from the color printing to the monochrome printing.

<Supplementary Note 3>

The image forming apparatus according to Supplementary Note 1 or 2, in which the restriction condition is for the printing type to be changed from the color printing to the monochrome printing and for execution time of the monochrome printing executed before the change of the printing type not to reach a first setting value set in advance.

<Supplementary Note 4>

The image forming apparatus according to any of Supplementary Notes 1 to 3, in which the restriction condition is for the printing type to be changed from the color printing to the monochrome printing and for a number of copies of the color printing executed before the change of the printing type not to reach a first setting value set in advance.

<Supplementary Note 5>

The image forming apparatus according to Supplementary Note 1, in which the restriction condition is for the printing type to be changed from the monochrome printing to the color printing.

<Supplementary Note 6>

The image forming apparatus according to any of Supplementary Notes 1 and 3 to 5, in which the restriction condition is for the printing type to be changed from the monochrome printing to the color printing and for time elapsed from execution of the last condition adjustment process not to reach a second setting value set in advance.

<Supplementary Note 7>

The image forming apparatus according to Supplementary Note 6, in which the elapsed time is time elapsed from the execution of the condition adjustment process on an image forming unit used for the color printing.

<Supplementary Note 8>

The image forming apparatus according to any of Supplementary Notes 1 and 3 to 7, in which the restriction condition is for the printing type to be changed from the monochrome printing to the color printing and for a number of copies after execution of the last condition adjustment process not to reach a second setting value set in advance.

<Supplementary Note 9>

The image forming apparatus according to Supplementary Note 8, in which the number of copies is a number of copies after the execution of the condition adjustment process on an image forming unit used for the color printing.

<Supplementary Note 10>

An image forming method, in which one or more processors execute a print step of controlling an image forming portion including image forming units corresponding to a plurality of colors, and executing monochrome printing of forming a monochrome image on a sheet on the basis of input image data or color printing of forming a color image on the sheet on the basis of the input image data, and an adjustment step of allowing, in a case where a printing type of a print process to be executed by the print step is changed from one of the monochrome printing and the color printing to another, a condition adjustment process of adjusting an image formation condition of the image forming portion to be executed before execution of the monochrome printing or the color printing subsequent to a change of the printing type, the print step allows line speed of the image forming portion to be changed depending on a combination of a line speed mode and the printing type set in advance in association with a sheet type of the sheet, and the adjustment step allows execution of the condition adjustment process to be restricted in a case where the line speed mode is identical before and after a change of the printing type and a restriction condition set in advance is satisfied.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a print processing portion configured to control an image forming portion including image forming units corresponding to a plurality of colors, and execute monochrome printing of forming a monochrome image on a sheet on a basis of input image data or color printing of forming a color image on the sheet on the basis of the input image data; and an adjustment processing portion configured to allow, in a case where a printing type of a print process to be executed by the print processing portion is changed from one of the monochrome printing and the color printing to another, a condition adjustment process of adjusting an image formation condition of the image forming portion to be executed before execution of the monochrome printing or the color printing subsequent to a change of the printing type, wherein the print processing portion allows line speed of the image forming portion to be changed depending on a combination of a line speed mode and the printing type set in advance in association with a sheet type of the sheet, and the adjustment processing portion allows execution of the condition adjustment process to be restricted in a case where the line speed mode is identical before and after a change of the printing type and a restriction condition set in advance is satisfied.

2. The image forming apparatus according to claim 1, wherein the restriction condition is for the printing type to be changed from the color printing to the monochrome printing.

3. The image forming apparatus according to claim 1, wherein the restriction condition is for the printing type to be changed from the color printing to the monochrome printing and for execution time of the monochrome printing executed before the change of the printing type not to reach a setting value set in advance.

4. The image forming apparatus according to claim 1, wherein the restriction condition is for the printing type to be changed from the color printing to the monochrome printing and for a number of copies of the color printing executed before the change of the printing type not to reach a setting value set in advance.

5. The image forming apparatus according to claim 1, wherein the restriction condition is for the printing type to be changed from the monochrome printing to the color printing.

6. The image forming apparatus according to claim 1, wherein the restriction condition is for the printing type to be changed from the monochrome printing to the color printing and for time elapsed from execution of a last condition adjustment process not to reach a second-setting value set in advance.

7. The image forming apparatus according to claim 6, wherein the elapsed time is time elapsed from the execution of the condition adjustment process on an image forming unit used for the color printing.

8. The image forming apparatus according to claim 1, wherein the restriction condition is for the printing type to be changed from the monochrome printing to the color printing and for a number of copies after execution of a last condition adjustment process not to reach a setting value set in advance.

9. The image forming apparatus according to claim 8, wherein the number of copies is a number of copies after the execution of the condition adjustment process on an image forming unit used for the color printing.

10. An image forming method, wherein one or more processors execute a print step of controlling an image forming portion including image forming units corresponding to a plurality of colors, and executing monochrome printing of forming a monochrome image on a sheet on a basis of input image data or color printing of forming a color image on the sheet on the basis of the input image data, and an adjustment step of allowing, in a case where a printing type of a print process to be executed by the print step is changed from one of the monochrome printing and the color printing to another, a condition adjustment process of adjusting an image formation condition of the image forming portion to be executed before execution of the monochrome printing or the color printing subsequent to a change of the printing type, the print step allows line speed of the image forming portion to be changed depending on a combination of a line speed mode and the printing type set in advance in association with a sheet type of the sheet, and the adjustment step allows execution of the condition adjustment process to be restricted in a case where the line speed mode is identical before and after a change of the printing type and a restriction condition set in advance is satisfied.

* * * * *